United States Patent

[11] 3,628,111

[72] Inventor  Kunio Goto
              Tokyo, Japan
[21] Appl. No. 881,649
[22] Filed     Dec. 3, 1969
[45] Patented  Dec. 14, 1971
[73] Assignee  Victor Company of Japan Limited
              Yokohama, Japan
[32] Priority  Mar. 7, 1967
[33]           Japan
[31]           42/13922
              Continuation-in-part of application Ser. No.
              711,028, Mar. 6, 1968, now Patent No.
              3,500,157. This application Dec. 3, 1969,
              Ser. No. 881,649
              The portion of the term of the patent
              subsequent to Mar. 10, 1987, has been
              disclaimed.

[54] SYSTEM FOR REMOVING IRREGULARITIES IN
     ROTATION FROM SYNCHRONOUS MOTOR
     4 Claims, 11 Drawing Figs.
[52] U.S. Cl. .................................................. 318/179,
                                                              318/184
[51] Int. Cl. ................................................... H02p 5/28
[50] Field of Search ........................................... 318/174,
                                                              179, 184

[56]              References Cited
              UNITED STATES PATENTS
2,415,405  2/1947  Barney ......................... 318/184
3,238,432  3/1966  Amberger .................... 318/184 X
3,388,305  6/1968  Smith .......................... 318/179
3,500,157  3/1970  Goto ............................ 318/179

Primary Examiner—Gene Z. Rubinson
Attorney—Louis Bernat

ABSTRACT: An electronic control system removes any irregularities in the rotation of an electrical motor by introducing a controlled DC bias component in the armature or field windings of the motor. The DC bias level is selected to produce a magnetic field which adds to or subtracts from the magnetic field produced by alternating current used to drive the motor. This way, the motor may receive an uneven torque which exactly compensates for any irregularity in the motor and causes the motor to run smoothly and evenly.

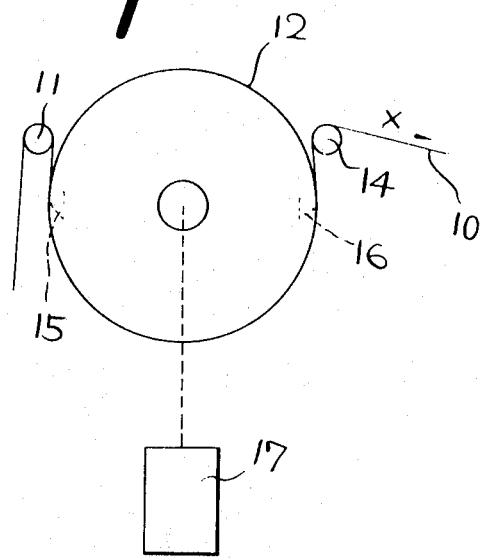
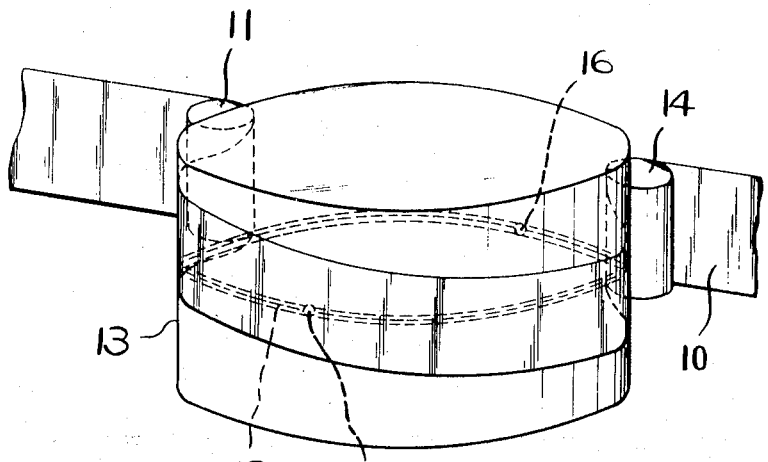
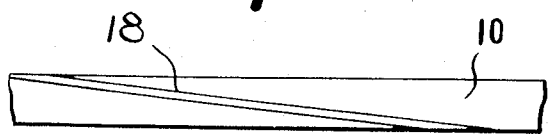
INVENTOR
KUNIO GOTO

INVENTOR
KUNIO GOTO

BY
ATTORNEY

INVENTOR
KUNIO GOTO

BY
ATTORNEY

SYSTEM FOR REMOVING IRREGULARITIES IN ROTATION FROM SYNCHRONOUS MOTOR

This is a continuation-in-part of my earlier copending application Ser. No. 711,028, filed Mar. 6, 1968, and assigned to the assignee of this invention, now U.S. Patent No. 3,500,157.

This invention relates to control circuits for synchronous motors, and more particularly to circuits for removing slight rotational irregularities, especially—although not exclusively—from motors for driving tape recorders.

Generally speaking, synchronous motors have very smooth and uniform rotational motion. Thus, they are ideally suited for driving the rotary magnetic heads of video tape recorders. Nevertheless, the motors are subject to minor rotational variations caused by such things as deviations in symmetry about the center axis, variations in mechanical loads, and distortions of driving wave forms.

Hitherto, various attempts have been made to remove these and other irregularities in the rotation of synchronous motors. One way to reduce these irregularities is to produce precision machine finishes on motor parts and to assemble the parts accurately and precisely. So far, these attempts have failed to provide satisfactory results because they are very complicated and exacting. As a result, it becomes impossible to carry these methods into practice.

In the system according to this invention, a direct current is applied to the armature windings of a synchronous motor. The magnitude and polarity of this current are varied with the varying phases of the synchronous motor. At the same time, an alternating current is applied to drive the motor. The position of the center of a revolving magnetic field produced by the alternating current may be displaced by a direct current magnetic field produced by the applied direct current. The amount of such displacement corresponds to the intensity and polarity of the DC current. Thus, the value and polarity of the direct current applied to the armature windings may be selected in such a manner that an irregularity in rotation originally existing in the motor can be compensated.

Accordingly, an object of this invention is to provide a system for removing irregularities in the revolution of synchronous electric motors.

Another object of the invention is to provide a system for removing irregularities in the rotation of synchronous motors responsive to a compensating direct current applied to the armature windings of the motor in addition to an alternating current used for driving the motor.

Still another object of the invention is to provide a system for removing irregularities in the revolution of synchronous motors by means of a simple circuit for applying a direct current to the armature windings of a synchronous motor in addition to an alternating current used for driving the motor.

One advantage of this invention lies in the cost reduction which occurs when a synchronous motor, built with high precision, is replaced by a low-cost motor. Since any difference between these two synchronous motors can readily be removed by the control circuitry, the standards of synchronous motors become much less severe.

Other objects and advantages of the present invention will become apparent from a consideration of the following description when taken in conjunction with the accompanying drawings, in which:

FIG. 1 is a schematic view of the essential portions of a conventional magnetic recording and reproducing apparatus;

FIG. 2 is a perspective view of essentially the same portions that are shown in FIG. 1;

FIG. 3 is a graphic illustration of recorded tracks on a magnetic tape shown in FIG. 1;

Figure 5:
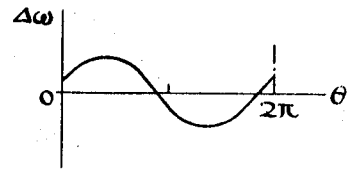
FIG. 5 is a diagram showing one example of an irregularity in a synchronous motor.
Figure 7:
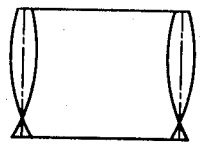
Figure 6:
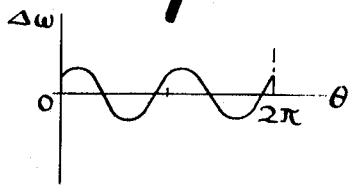
FIG. 6 is a diagram showing another irregularity in the motor.
Figure 8:
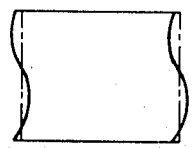
Figure 9:
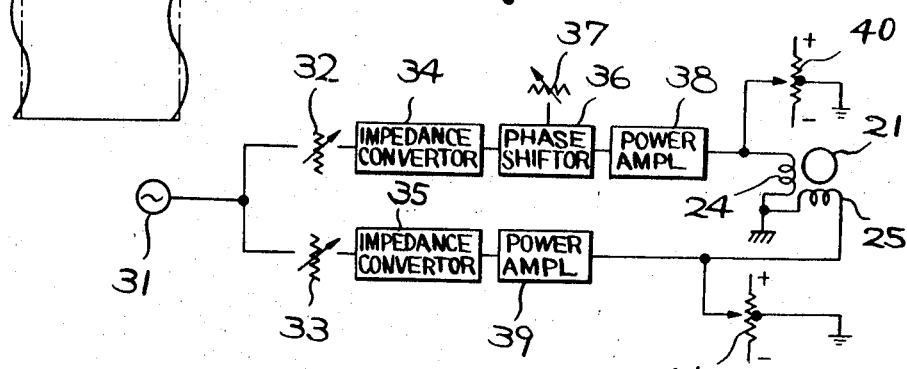
Figure 10:
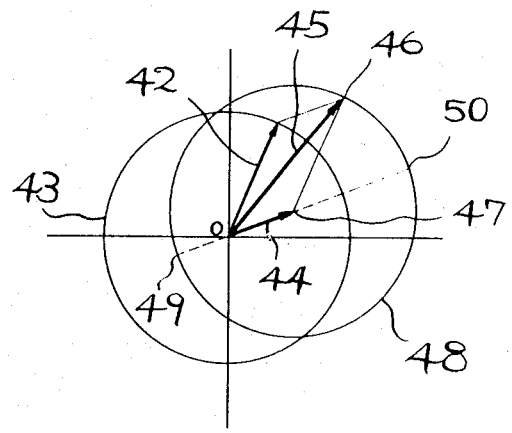
Figure 11:
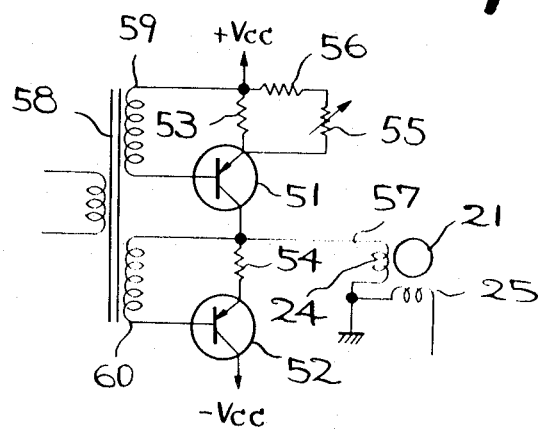

FIG. 7 graphically shows the distortion of a television picture reproduced by a magnetic recording apparatus driven by a synchronous motor having the type of irregularity shown in FIG. 5;

FIG. 8 is a similar graphic view showing the distortion of a television picture responsive to the irregularity shown in FIG. 6;

FIG. 9 is a combined block and systematic diagram of one embodiment of the control circuit designed according to this invention;

FIG. 10 is a vector diagram showing a revolving magnetic field in an electric motor of the type described herein; and FIG. 11 is a schematic circuit diagram showing one example of the circuit for passing both direct and alternating currents to a synchronous motor.

To facilitate an understanding of the invention, FIG. 1 shows one example of a magnetic recording and reproducing apparatus to which this invention can be applied. However, the inventive system is not necessarily limited to this particular type of apparatus. The invention can have application to all types of precision machines and apparatus using a synchronous motor.

In FIGS. 1 and 2, the magnetic tape 10 is unwound from a supply reel (not shown) and moved in the direction of arrow X by a capstan and a pinch roller (not shown). The magnetic tape 10 travels past a guide roller 11, maintained in the manner of an Ω wrap along substantially one half the outer circumferential surface of a guide drum 13, and past another guide roller 14 to a takeup reel (not shown). Magnetic heads 15 and 16 are positioned diametrically opposite each other on the peripheral edge of a rotary disk 12. The rotary disk 12 is positioned inside drum 13 and rotated by a synchronous motor 17. The rotation is about the center axis of the disk revolution and at a rate which is substantially higher than the rate of tape movement.

When the apparatus described above records signals on the magnetic tape, oblique tracks are recorded on the magnetic tape as represented by elongated lines 18 (FIG. 3). These tracks are parallel to each other and are disposed obliquely with respect to the longitudinal axis of the tape. The angular position of the tracks occurs because the magnetic tape 10 travels obliquely with respect to the rotational path of the magnetic heads 15 and 16, as shown in FIG. 2.

Figure 4:
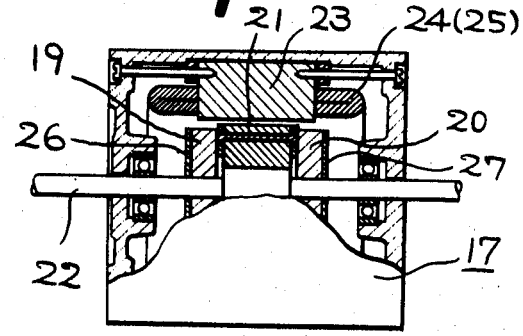
FIG. 4 is a longitudinal—partly cross-sectional—view of an exemplary synchronous motor controlled according to the invention.

FIG. 4 shows, in detail, a two-phase synchronous motor 17. Two ferrite permanent magnets 19 and 20 have their magnetic poles oriented in the same polar direction. A cage rotor 21 and magnets 19 and 20 are firmly secured to rotate as a unit on a rotary shaft 22 of the motor. The permanent magnets 19 and 20 are separated from a stator 23 by a space of conventional dimensions. The stator 23 has two armature windings 24 and 25 which are energized by two phases of alternating current. Two balancing plates 26 and 27 are mounted on the opposite ends of the rotor in order to maintain the dynamic balancing of the rotor.

Let us assume that one field of video signals is recorded in a single oblique track as shown in FIG. 3. The curve of FIG. 5 shows a variation in the rate of revolution of the synchronous motor during one complete revolution. The horizontal axis of FIG. 5 represents a rotational angle $\theta$, and the vertical axis represents an amount $\Delta\omega$ of deviation of speed from the average rotational angular velocity of the motor. The curve indicates that there is an irregularity in rotation of one cycle during one revolution of the motor.

If the signals recorded in the tracks on the magnetic tape shown in FIG. 3 are reproduced by means of the apparatus shown in FIG. 2, and if the synchronous motor has an irregularity in revolution as illustrated in FIG. 5, the reproduced picture has distortion as illustrated in FIG. 7. This distortion occurs because television video signals of an odd number field and an even number field are reproduced by the magnetic heads 15 and 16, respectively, during one complete revolution of the synchronous motor 17.

If a synchronous motor is used, and it has an irregularity in rotation as illustrated in FIG. 6, the distortion of reproduced pictures is as shown in FIG. 8. The two cycle irregularity occurring during one complete revolution of the motor makes the picture distortion of an odd numbered field identical with the distortion of an even numbered field. For the distortion shown in FIG. 8, the deterioration of the reproduced picture is not substantial if the amount of distortion is small. However, the distortion of the reproduced picture of the type shown in FIG. 7 markedly impairs the quality of the picture even if the amount of distortion is small.

The system according to this invention enables a removal of the irregularities in the revolution (described above) of synchronous motors. FIG. 9 shows a systematic diagram of one embodiment of the invention.

An AC power source 31 has output voltages in sine wave form of desired frequencies. These forms are applied to impedance converters 34 and 35, respectively, through gain controllers 32 and 33. The output voltage of the impedance converter 34 is applied to a power amplifier 38 through a phase shifter 36. The output voltage of the impedance converter 35 is applied directly to a power amplifier 39. The outputs of power amplifiers 38 and 39 are supplied to the armature windings 24 and 25, respectively, of the two-phase synchronous electric motor. A variable resistor 37 can adjust the phase shift angle of the output voltage of the phase shifter 36 relative to the phase of the input voltage. This angle can be adjusted within a range of 0° to 180°. A direct current, whose polarity and value can be adjusted by variable resistors 40 and 41, is applied to the armature windings 24 and 25 through said resistors. In addition, the alternating current outputs of the power amplifiers 38 and 39 may also be applied to the windings 24 and 25. Accordingly, the rotor 21 os the two-phase synchronous electric motor is rotated by a resultant revolving magnetic field arising from a revolving magnetic field formed by the alternating current flowing to the armature windings 24 and 25 and by a unidirectional direct current magnetic field formed by the direct current also flowing to the armature windings 24 and 25.

This resultant revolving magnetic field is illustrated in FIG. 10. The revolving magnetic field formed by the two-phase alternating current supplied by the power amplifiers 38 and 39 can be expressed by a vector 42 having a tip revolving at a constant angular velocity about the origin point 0. The stationary magnetic field formed by the direct current supplied through the variable resistors 40 and 41 can be expressed by a stationary vector 44.

Accordingly, the resultant revolving magnetic field arising from the revolving vector 42 and the stationary vector 44 can be expressed by a composite vector 45. The tip 46 of the vector 45 moves along a circle 48 with its center at the tip 47 of the stationary vector 44. The circle 48 has the same radius as a circle 43 traced by the tip of the revolving vector 42. The angular velocity at which the composite vector 45 revolves about the origin point 0 is maximized at a point 49 at which the extension, in one direction, of the stationary vector 44 intersects the circle 48. Angular velocity is minimized at a point 50 at which the extension, in the other direction, of the stationary vector 44 intersects the circle 48. In other words, the rotational angular velocity of the resultant magnetic field, about the origin point 0, grows higher near the point 49 and smaller near the point 50. Thus, the rotor 21 of the synchronous motor driven by this resultant revolving magnetic field is subjected to a variation of one cycle in speed during one complete revolution.

The size and direction of the vector 44 of the stationary magnetic field can be varied by adjusting the variable resistors 40 and 41. Thus, the amount and phase of a variation in speed of the rotor 21 can be adjusted to any value, as desired. It is now evident that one cycle of irregularity occurring during one complete revolution can be compensated by the process described above. The end can readily be attained by adjusting the variable resistors 40 and 41 while viewing the distortion of the picture as shown in FIG. 7, in an effort to correct the distortion. The direct current applied to the armature windings, for the purpose of removing irregularities in the revolution, may generally have a value which is smaller than the value of the alternating current applied to the same windings.

In the system described above for removing irregularities in revolution, the alternating currents flowing through the armature windings 24 and 25 must of course be made to differ in phase from each other by 90°. This is done by adjusting the variable resistor 37, so that the tip of the revolving vector 42 can draw a true circle.

The system according to this invention permits the removal of an irregularity in revolution which occurs in two cycles as well as in one cycle during one complete revolution. In this case, the gain controllers 32 and 33 are adjusted so that the output currents of the power amplifiers 38 and 39 will have different values. The variable resistor 37 is also adjusted to have a proper value. As a result, the path of the tip of the revolving AC vector 42 is not circular (as shown at 43 in FIG. 10) but elliptic, with the main axis extending in any direction as desired. Accordingly, the path of the tip of the resultant vector 45 forms an ellipse similar to the ellipse formed by the tip of the vector 42. Thus, when the vector of the resultant revolving magnetic field rotates about the origin point 0, the rate of revolution of the rotor 21 contains one cycle of speed variation and two cycles of speed variation during one complete revolution. Thus, any irregularity in revolution existing in a synchronous motor can be removed by compensation means causing this resultant revolving magnetic field.

Next to be described is a process for reducing the consumption of direct current when it is applied to the armature windings of a synchronous motor in addition to the alternating current. In the system shown in FIG. 9, the direct current portions flow through the variable resistors 40 and 41 and the power is consumed at all times. If the circuit of FIG. 11 is used, the consumption of direct currents can be reduced to a nominal value.

The circuit shown in FIG. 11 corresponds to the circuit of the power amplifier 38, the armature windings 24 and 25, and the rotor 21 of the synchronous motor as shown in FIG. 9. A circuit similar to the described circuit is used for the power amplifier 39. Emitter resistances 53 and 54 are connected at one end to the emitters of transistors 51 and 52, respectively. A series circuit of a variable resistor 55 and a fixed resistor 56 is connected in parallel with the emitter resistance 53. The other end of the emitter resistance 54 is connected to the transistor 51 at a junction 57 which forms an output terminal connected to the armature winding 24.

A direct current voltage +Vcc is applied through the emitter resistance 53 to the emitter of transistor 51. A direct current voltage −Vcc is applied to the collector of transistor 52. The DC voltage +Vcc has a positive polarity with respect to the ground and the DC voltage −Vcc has a negative polarity with respect to the ground. These two voltages have equal value. An input transformer 58 has two secondary windings 59 and 60. The winding 59 has its opposite ends connected to the base of the transistor 51 and to the supply point of +Vcc voltage, respectively. The other winding 60 has its opposite ends connected to the base of transistor 52 and the junction point 57, respectively. These connections are such that when a current signal flows through the primary windings of the transformer 58, the voltages induced in the secondary windings 59 and 60 are equal in amplitude and reversed in polarity with respect to the bases of transistors 51 and 52. The transistors 51 and 52 are selected so that their characteristics are equal to each other.

If the transistors 51 and 52 have a balanced gain when an AC voltage is applied to the primary windings of the transformer 58, only the AC will flow through the armature winding 24 and no DC current will flow. However, if the value of variable resistor 55 is changed to unbalance the gain between the transistors, the current flowing through the transistors 51 and 52 have different DC portions. The result is that a DC current corresponding to this difference in DC portions flows in the armature winding 24. The value and polarity of the DC current in winding 24 can be varied as desired by adjusting the variable resistor 55.

In like manner, a stationary DC magnetic field, and hence a resultant stationary magnetic field, can be formed by this DC current. Then, the DC current flows through the armature winding 25 when a circuit, similar to the circuit described above, is connected to the armature winding 25. Thus, any irregularity in revolution can be removed by compensation in the same manner as described with reference to the system shown in FIG. 9. From the foregoing description, it will be appreciated that the system according to this invention is very advantageous since irregularities in revolution of synchronous motors can be removed by using a very simple construction.

The system is characterized in that irregularities in revolution originally existing in a synchronous motor can be compensated by intentionally varying a direct current applied to the armature windings in addition to the alternating current which drives the motor.

It is evident that the system constructed according to this invention can be applied not only to two-phase synchronous motors but also to three-phase synchronous motors. However, it is to be understood that the invention is not limited to the embodiments shown and described herein. Many changes and modifications may be made without departing from the spirit of the invention.

I claim:

1. In a system for electrically biasing synchronous electric motors to remove rotational irregularities, the combination comprising a synchronous motor having a rotor and a plurality of armature windings, means responsive to an alternating current in said armature windings for producing a revolving magnetic field to produce a revolution of said rotor, means for supplying a direct current bias to said armature windings, and means for selecting a value and polarity of the direct current for producing a resultant magnetic field arising from a combination of the stationary magnetic field produced by the direct current and said revolving magnetic field produced by the alternating circuit, said resultant field compensating for any inherent irregularity in the revolution of said synchronous motor, wherein the resultant magnetic field is a circular field having its center displaced from the center of rotor revolution by a distance equal and opposite to any unwanted displacement of the mechanical center of rotation which causes said rotational irregularities.

2. The system of claim 1 wherein said synchronous motor is a two-phase synchronous motor.

3. The system of claim 1 in which said means for producing a revolving magnetic field comprises phase shifter circuit means for varying the phase of output alternating current voltage with respect to the phase of input alternating current voltage.

4. The system of claim 1 in which said means for producing a revolving magnetic field comprises phase shifter circuit means capable of varying the phase of output alternating current voltage with respect to the phase of input alternating current voltage within a range extending from 0° to 180°, two adjuster means for varying the value of said alternating current voltage, means for applying said alternating current voltage to a first armature winding of one phase through one of said adjuster means and through said phase shifter circuit means, means for applying said alternating current voltage to another armature winding of a second phase through the other of said adjuster means, and means including said adjuster means for selecting the value of alternating current voltage flowing through the armature windings of the first and second phases.

* * * * *